United States Patent
Evans et al.

(10) Patent No.: US 9,209,612 B2
(45) Date of Patent: Dec. 8, 2015

(54) ELECTRICAL JUNCTION BOX MOUNT

(76) Inventors: Jonathan Martin Evans, Pearland, TX (US); Larry Dean Reed, Pearland, TX (US)

(\*) Notice: Subject to any disclaimer, the term of this patent is extended or adjusted under 35 U.S.C. 154(b) by 267 days.

(21) Appl. No.: 13/445,563

(22) Filed: Apr. 12, 2012

(65) Prior Publication Data

US 2012/0272615 A1  Nov. 1, 2012

Related U.S. Application Data

(60) Provisional application No. 61/517,826, filed on Apr. 27, 2011.

(51) Int. Cl.
| | |
|---|---|
| A47H 1/10 | (2006.01) |
| H02G 3/12 | (2006.01) |
| H02G 3/20 | (2006.01) |
| E04B 9/00 | (2006.01) |

(52) U.S. Cl.
CPC ............... *H02G 3/125* (2013.01); *E04B 9/006* (2013.01); *H02G 3/20* (2013.01)

(58) Field of Classification Search
USPC .................. 248/200.1, 343, 58, 906
See application file for complete search history.

(56) References Cited

U.S. PATENT DOCUMENTS

| | | | | |
|---|---|---|---|---|
| 3,420,995 | A | * | 1/1969 | Dunckel .................. 362/366 |
| 3,606,223 | A | * | 9/1971 | Havener .................. 248/205.1 |
| 5,330,137 | A | * | 7/1994 | Oliva ........................ 248/27.1 |
| 6,098,939 | A | | 8/2000 | He |
| 6,491,270 | B1 | * | 12/2002 | Pfaller ..................... 248/200.1 |
| 6,768,071 | B1 | | 7/2004 | Gretz |
| 7,036,782 | B2 | | 5/2006 | Cheatham et al. |
| 7,355,118 | B1 | | 4/2008 | Gretz |
| 7,645,189 | B2 | * | 1/2010 | Pilger ......................... 454/330 |
| 7,805,904 | B2 | | 10/2010 | Clark et al. |
| 7,857,275 | B2 | | 12/2010 | De la Borbolla |
| 7,874,539 | B2 | | 1/2011 | Wright et al. |
| 8,702,047 | B2 | * | 4/2014 | Nuernberger et al. ..... 248/200.1 |
| 2006/0005495 | A1 | | 1/2006 | Stessel et al. |

\* cited by examiner

*Primary Examiner* — Amy Sterling
(74) *Attorney, Agent, or Firm* — Mossman Kumar & Tyler PC

(57) ABSTRACT

Attachment of electrical junction box mounts to junction box by a single step or through a single motion. Mounts may be constructed as a single part. Electrical junction box ceiling mount includes a spanning element for traversing an acoustical ceiling tile and a support element connected to the spanning element. The support element includes a fastener adapted to engage a sidewall of an electrical junction box, including one or more faces of the sidewall. The support element may also include a bracket configured to support a portion of a rim of the front opening of the electrical junction box. The fastener may include a bracket configured for an interference fit with the sidewall of the electrical junction box. The fastener may also include a bracket adapted to engage an outside face of the sidewall on opposing sides of the electrical junction box.

6 Claims, 9 Drawing Sheets

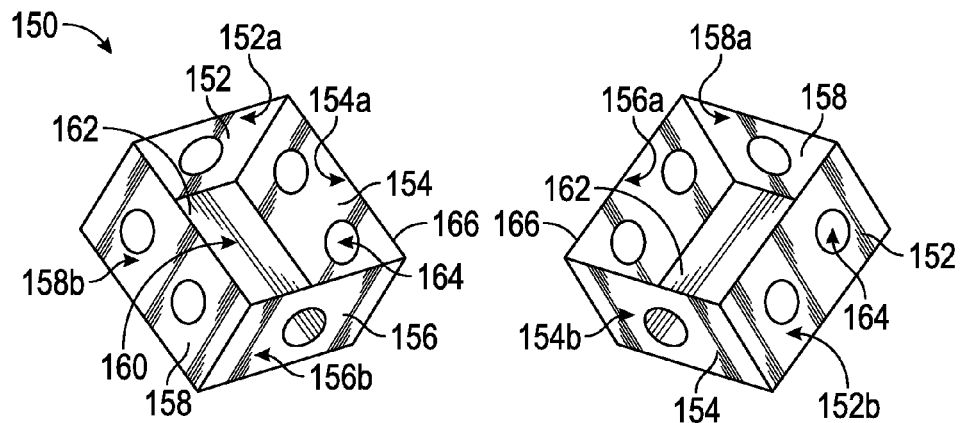
FIG. 1A
(Prior Art)
FIG. 1B
(Prior Art)
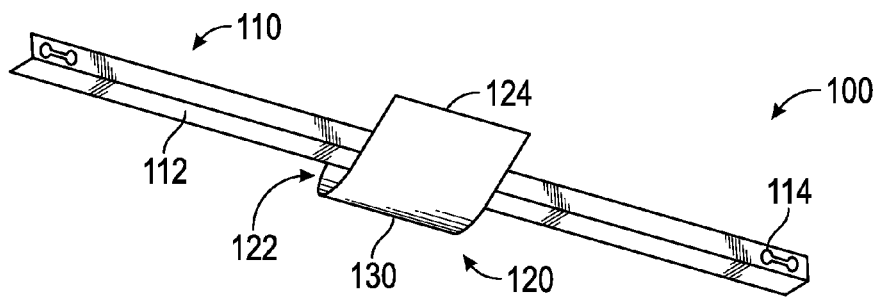
FIG. 2A
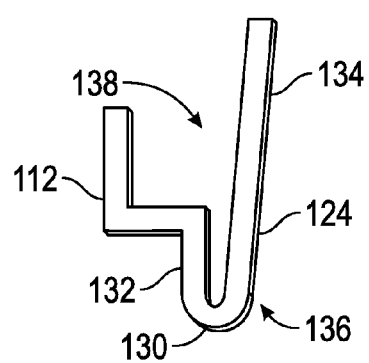
FIG. 2B

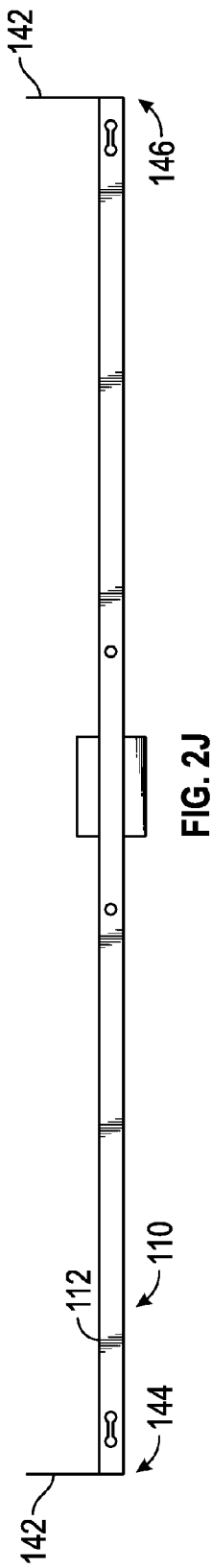
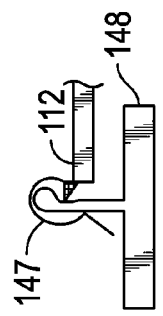
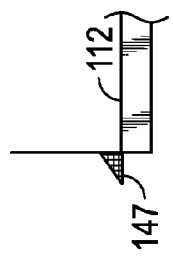
FIG. 2J
FIG. 2L
FIG. 2K

ELECTRICAL JUNCTION BOX MOUNT

PRIORITY

This application claims priority from U.S. provisional patent application Ser. No. 61/517,826, filed Apr. 27, 2011, which is hereby incorporated by reference.

BACKGROUND

Suspended ceiling assemblies are commonly used in commercial or office environments, such as stores and office buildings. Suspended ceiling assemblies (also known as suspension ceilings, hanging ceilings, false ceilings, drop ceilings, or acoustical tile ceilings) employ a framework supported by other architectural elements of the building. For example, the framework may rest on lateral beams or may be suspended by wires. In turn, this framework supports a number of acoustical ceiling tiles in the form of panels. This framework is commonly implemented as a grid of frame members defining a number of openings. Installation of ceiling tile panels may be accomplished by hanging the panels so that the panel covers the opening between the frame members while at least the edges of the panels rest on the framework.

Environments where suspended ceilings are found often require the use of low-voltage devices in overhead locations, such as, for example, components for fire control, data transmission, security and so on. It has been recognized in the construction industry that expedient overhead installation of low-voltage devices may be achieved by installing an electrical junction box (referred to hereinafter as an "electrical box") directly above a ceiling tile and connecting the low-voltage device to the electrical box through an opening in the tile. Historically, electrical boxes have been supported using support structures such as angle iron or unistruts which are custom cut at the job site.

More recently, electrical boxes have been installed through the use of an electrical box mount including a mounting rail or other spanning element which attaches to elements of the framework. Mounting the electrical box to the electrical box mount is carried out by removing a knockout from the electrical box and attaching the electrical box to the mount through the use of a clip or screw inserted through the knockout, which secures the electrical box to the mount. Examples of electrical box mounting systems include the CADDY 512 and 517 series box hanger produced by Erico, Inc. of Solon, Ohio and the Cooper B-Line of box hangers from Cooper Industries of Houston, Tex.

SUMMARY

Prior art electrical boxes are configured so that installing an electrical box to the electrical box mount is carried out by removing a knockout from the back wall of the electrical box and inserting a screw or clip through the knockout, which secures the electrical box to the mount.

Generally, aspects of the present invention provide for rapid mounting of electrical junction boxes in ceiling environments, such as, for example, commercial ceilings. For example, in some aspects of the present disclosure, electrical box mounts may allow for installation of the electrical box in a ceiling featuring suspended acoustical tile, a grid frame, or both. Some embodiments allow for tool-free mounting. In some aspects of the disclosure, the electrical box mount is adapted so that attachment of the electrical box mounts may be carried out in a single step or through a single motion. In other aspects, the disclosure allows for construction of the electrical box mount as a single part. Further aspects of the present invention may facilitate manufacture of electrical junction box mounts.

One general embodiment includes an electrical box ceiling mount comprising a spanning element for traversing an acoustical ceiling tile and a support element connected to the spanning element. Other general embodiments include an electrical box ceiling mount including a support element adapted for single motion engagement with an electrical box and further adapted for engagement with a spanning element.

The support element may include a fastener adapted to engage a sidewall of an electrical box. The support element may be adapted to engage one or more faces of the sidewall. The support element may also include a bracket configured to support a portion of a rim of the front opening of the electrical box.

The fastener may include a bracket configured for an interference fit with the sidewall of the electrical box, such as, for example, by providing an interference fit with one or more faces of the sidewall. The bracket may be implemented as a folded tab protruding from the mounting rail. In other embodiments, the support element may include a clip configured for a spring tension fit with the sidewall of the electrical box, such as by gripping the faces of the sidewall. The fastener may also include a bracket adapted to engage outside faces of the sidewall on opposing sides of the electrical box.

The support element may be adapted for tool-free engagement with an electrical box. The support element may be adapted such that, when engaged with an electrical box, a front opening of the electrical box faces the ceiling tile upon the installation of the spanning element. The support element may be adapted for engagement with the spanning element.

Alternatively, the support element may be integral to the spanning element. That is, the spanning element and the support element may be formed from the same continuous piece of material, which may thereby reduce the complexity of the electrical box mount. Reduced complexity may facilitate use of the electrical box mount in the field. In some embodiments, engaging the support element with the electrical box may be carried out in a single motion. This single motion attachment may decrease the time required to mount the electrical box and save labor costs. Additionally or alternatively, the integral construction may facilitate manufacturing by increasing efficiency and decreasing costs. Similarly, the integral design may improve durability.

Some embodiments may include an electrical box ceiling mount configured for a ceiling including lateral support elements. The lateral support elements, such as, for example, ceiling joists or frame elements, may occur at intervals. For example, support elements may occur at regular intervals in one direction (e.g., joists hung substantially parallel to one another every 16 inches) or more than one direction (e.g., a grid of frame members for a suspended ceiling). The electrical box ceiling mount may include a spanning element for traversing an area between consecutive lateral support elements; and a support element connected to the mounting rail. The support element may be adapted for engagement with an electrical box such that, while engaged, a front opening of the electrical box faces the ceiling tile upon the installation of the mounting rail. The electrical box ceiling mount may be adapted for single motion and/or tool-free engagement.

The foregoing and other objects, features and advantages of the disclosure will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

The following figures are part of the present specification, included to demonstrate certain aspects of embodiments of the present disclosure and referenced in the detailed description herein. Unless otherwise noted, figures are not drawn to scale.

FIGS. 1A and 1B illustrate perspective views of a prior art electrical junction box.

FIGS. 2A-2C illustrate an example electrical box mount configured for use as one of a pair of electrical box mounts in mounting an electrical box in accordance with embodiments of the invention.

FIGS. 2J-2L illustrate an example paired-use electrical box mount including a fastener in accordance with embodiments of the invention.

DETAILED DESCRIPTION

Figure 2C:
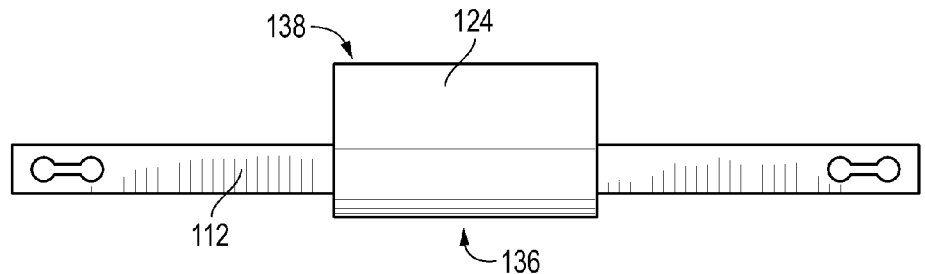

The principles of the invention are explained by describing in detail, specific example embodiments of devices, systems and methods for mounting electrical boxes. Those skilled in the art will understand, however, that the invention may be embodied as many other devices, systems, and methods. For example, various aspects of the methods and devices may be combined in various ways or with various products, including existing products. Many modifications and variations will be apparent to those of ordinary skill in the art. Embodiments were chosen and described in order to best explain the principles of the invention and the practical application, and to enable others of ordinary skill in the art to understand the invention for various embodiments with various modifications as are suited to the particular use contemplated. The scope of the invention is not intended to be limited by the details of exemplary embodiments described herein. The scope of the invention should be determined through study of the appended claims.

Aspects of the present invention are described below with reference to flowchart illustrations and/or block diagrams of methods according to embodiments of the invention. Specific design details have been provided for illustration, but should not be considered limiting. Readers of skill in the art will recognize that many variations of electrical box mount may be implemented consistent with the scope of the invention as described by the appended claims.

In general aspects of the disclosure, electrical junction box mounts may allow for installation of an electrical junction box in suspended ceilings. FIGS. 1A and 1B illustrate perspective views of a prior art electrical junction box. Electrical box 150 is of a type commonly used in the field, and is made of metal, plastic, resin, polymeric material (e.g., polyvinyl chloride), or other materials. Electrical box 150 has four sidewalls 152-158, a front opening 160, and a back wall 162. A front rim 166 runs along the four sidewalls 152-158 at the front opening 160. Sidewalls 152-158 and back wall 162 include knockouts 164 standard to the industry. Although not depicted here, other electrical boxes of various dimensions for a variety of uses are readily commercially available and may be used in conjunction with embodiments of the present invention.

FIGS. 2A-2K illustrate example electrical junction box mounts (hereinafter referred to as electrical box mounts) for installation of electrical boxes in suspended ceilings in accordance with embodiments of the invention. FIG. 2A illustrates a perspective view of an electrical box ceiling mount in accordance with embodiments of the invention. FIG. 2B illustrates a profile view of the same electrical box ceiling mount. FIG. 2C (not to scale) illustrates a side view of the same electrical box ceiling mount. Referring to FIGS. 2A-2E, an electrical box ceiling mount 100 includes a spanning element 110 for traversing an acoustical ceiling tile and a support element 120 connected to the spanning element 110. Support element 120 engages electrical box 150 for installation.

Generally, some embodiments are designed so that only a single electrical box mount is required for mounting an electrical box. These "single use" embodiments may have support elements that engage two or more sidewalls. Other embodiments are designed so that multiple electrical box mounts (e.g., 2, 3, 4, or more) are used in conjunction to mount an electrical box. The support provided by one of these mounts may be insufficient alone. In some embodiments, this type of "matched" mount may engage a single sidewall, although other embodiments of "matched" mounts may engage portions of multiple sidewalls, while still being configured for pairing the mount with further electrical box mounts.

FIGS. 2A-2C illustrate an example electrical box mount configured for use as one of a pair of electrical box mounts in mounting an electrical box in accordance with embodiments of the invention. As shown in FIGS. 2A-2C, the spanning element 110 is implemented as a mounting rail 112. Mounting rail 112 is constructed of rigid material, such as, for example, galvanized sheet metal (e.g., galvanized steel or spring steel), extruded plastics, extruded metal (e.g., aluminum), die cast metals (e.g., zinc, aluminum), composite materials, and so on as will occur to those of skill in the art. Mounting rail 112 is shown as being in the shape of an angle (also known as "angle iron") with an L-shaped cross-section. In other embodiments, mounting rail 112, or portions thereof, may be V-shaped, T-shaped, Z-shaped, channel shaped, or other structural shapes such as a beam (e.g., I-beam), hollow structural section ('HSS') (e.g., tubular shapes with square, rectangular, circular or elliptical cross sections), rail, bar, rod, plate, open web joist, and the like, or combinations of the above.

Mounting rail 112 is configured so that upon electrical box ceiling mount 100 being engaged with an electrical box oriented to face a ceiling tile, the flange is parallel to the plane of the tile. Thus, upon installation, the flange may lay flat against the tile, or against structural elements (e.g., frame elements). Alternatively, mounting rails 112 may also be configured so that either the top or bottom of a V-shaped rail rests on structural elements. Various configurations of the mounting rail may be used in other embodiments. The mounting rail 112 may include a fastener (not shown) adapted to engage one or more ceiling tile support frame elements, or the mounting rail 112 may define an opening 114 for receiving wire used in connecting the mounting rail to a support structure. The mounting rail may be between 11.75 and 25 inches in length; one example length may be 23.75 inches.

Figure 2D:
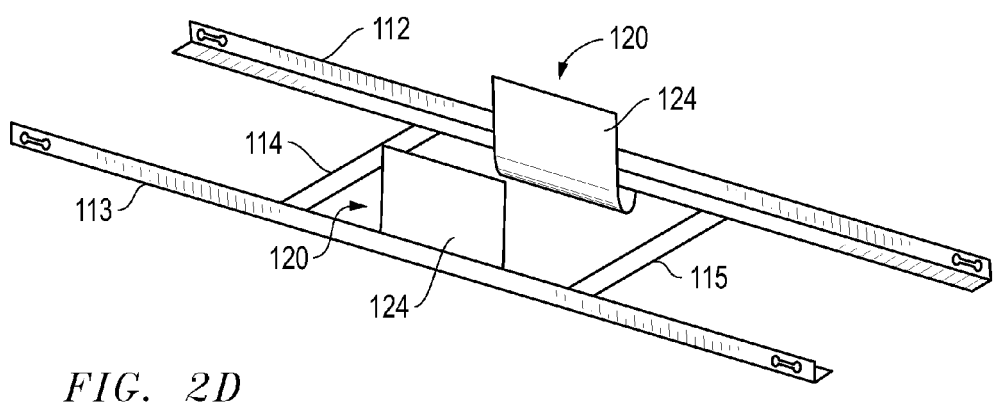
FIGS. 2D and 2E illustrate perspective and overhead views, respectively, of two example electrical box mounts configured for use alone in mounting an electrical box in accordance with embodiments of the invention.
Figure 2E:
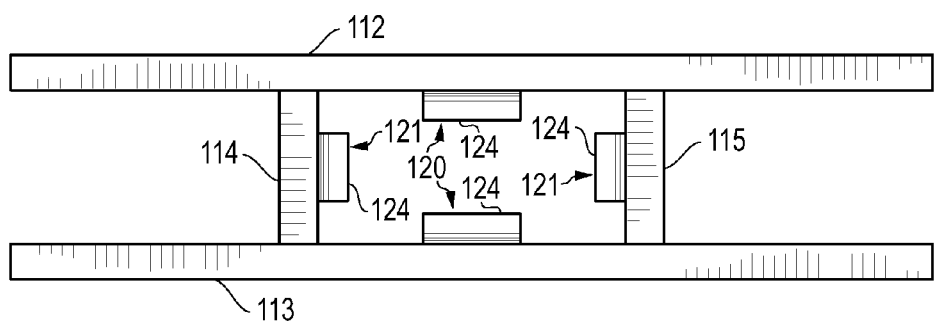

FIGS. 2D and 2E illustrate perspective and overhead views, respectively, of two example electrical box mounts configured for use alone in mounting an electrical box in accordance with embodiments of the invention. As shown in FIGS. 2D and 2E, electrical box mount 100 may include a plurality of spanning elements 110, implemented here as mounting rails 112, 113. Referring to FIG. 2D, each mounting rail 112, 113 includes a connected support element 120, such as, for example, bracket 124. The mounting rails 112, 113 are joined by coupling members 114, 115, which may be manufactured integral to mounting rails 112, 113, or attached later. In some applications, coupling members 114, 115 may be attached immediately before or after engagement of the mounting rails with the electrical box. Coupling members 114, 115 may be adapted for snap-on, clip-on, or other rapid attachment to mounting rails 112, 113, or may be attached with conventional fasteners (e.g., screws, rivets, nuts and bolts, etc). Referring to FIG. 2E, electrical box mount 100 includes a similar configuration of mounting rails 112, 113 and coupling members 114, 115 as to the embodiment shown by FIG. 2D. However, each mounting rail 112, 113 and each connected coupling members 114, 115 includes a support member 120, 121.

Figure 2F:
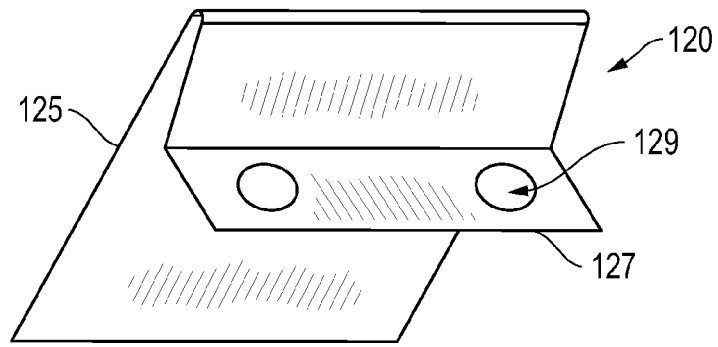
FIG. 2F illustrates an example electrical box mount configured for use in combination with a spanning element in mounting an electrical box in accordance with embodiments of the invention.

Similarly, in some embodiments, support element 120 may be adapted for engagement with a spanning element 110 instead of being integrally manufactured with spanning element 110. FIG. 2F illustrates an example electrical box mount configured for use in combination with a spanning element in mounting an electrical box in accordance with embodiments of the invention. Referring to FIG. 2F, support element 120 includes a bracket 125 connected with a bracket 127 defining openings 129 adapted to receive screws or bolts for coupling the support element 120 with a spanning element 110. In other implementations, fastener 127 may be a clamp, clip, tube, and so on (not shown), or any other conventional fastener for coupling the support element 120 with a spanning element 110.

Figure 2G:
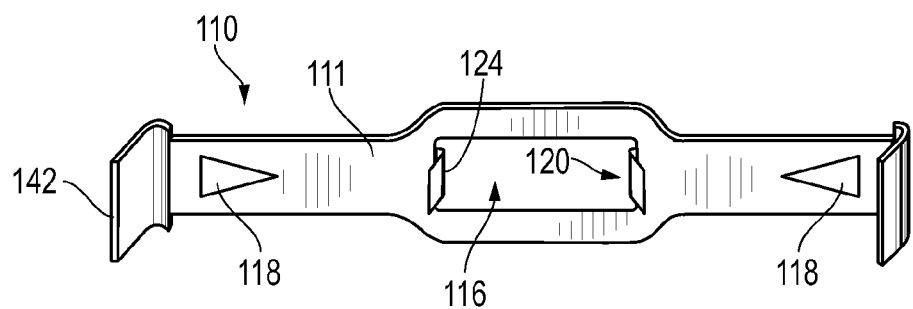
FIGS. 2G and 2H illustrate another example electrical box mount configured for use alone in mounting an electrical box in accordance with embodiments of the invention.
Figure 2H:
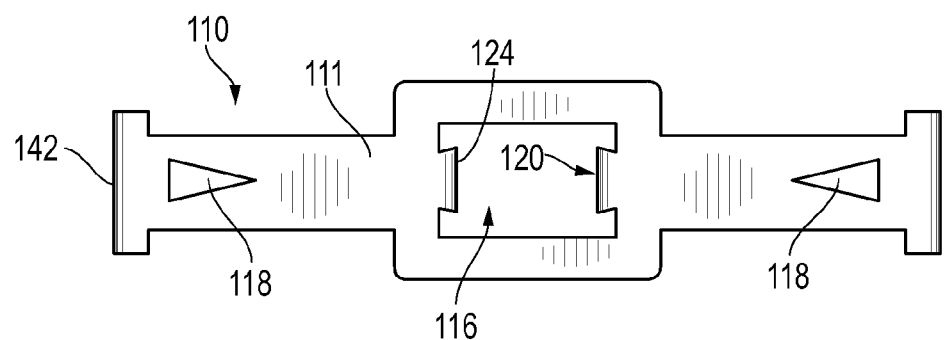

FIGS. 2G and 2H illustrate another example electrical box mount configured for use alone in mounting an electrical box in accordance with embodiments of the invention. As shown in FIGS. 2G and 2H, the spanning element 110 is implemented as a base 111 with a central opening 116. Base 111 also includes cutouts 118 allowing less material to be used. Other embodiments may include more or fewer cutouts 118, or may exclude cutouts. Cutouts may be of any shape practical for saving material while maintaining requisite structural strength. Spanning element 110 further includes a fastener 142 adapted to engage a structural member such as a frame member (not shown). Example fasteners 142 may include a clip, a clamp, a bracket, or any other fastener as will occur to those of skill in the art.

FIGS. 2J-2L illustrate an example paired-use electrical box mount including a fastener in accordance with embodiments of the invention. As shown in FIG. 2J, the spanning element 110 is implemented as a mounting rail 112. Fasteners 142 are coupled to the mounting rail 112 at opposite ends 144, 146. As shown here, fasteners 142 are integral with mounting rail 112 and are adapted to be folded (e.g., bent) over and/or around a structural member, such as a frame member, during installation. FIG. 2K shows a profile view of a fastener 142 in accordance with embodiments of the invention having a tab 147 for engaging a frame member 148. FIG. 2K illustrates the electrical box mount after installation. Fastener 142 is folded over frame member 148 with the head of frame member 148 constraining mounting rail 112 via tab 147.

Support element 120 is adapted to engage electrical box 150 to mount electrical box 150 on electrical box mount 100. Support element 120 may be adapted for tool-free engagement with the electrical box 150. For example, support element 120 may be a fastener 122 adapted to engage one or more faces 152a, 152b of one or more of the sidewalls 152. As shown in FIGS. 2A-3D, support element 120 is implemented as a bracket 124 configured to produce an interference fit with the sidewall of the electrical box. The bracket 124 may include a sheath, groove, or other element adapted to receive the sidewall of the electrical box. Bracket 124 may also be configured to support a portion of a rim 166 of the front opening of the electrical box. In operation, the front rim 166 may rest on crook 130, which provides support from underneath.

Similarly to spanning element 110, support element 120 may feature cutouts (not shown) to save material or improve ease of handling. Conversely, support element 120 may be reinforced through the application of coating materials or structural components (not shown) to all or selected portions of the support element 120. For example, additional steel or composite ribs may be glued, welded, or molded to the main body of the support element 120.

Bracket 124 comprises a sheath adapted to receive the sidewall of the electrical box. The sheath is implemented as a folded element having a "V" or "taco" shaped profile with a joined end 136 (the bottom of the "V") and an open end 138. As shown in FIG. 2A-2C, bracket 124 comprises a folded tab protruding from the mounting rail. This folded tab structure may be achieved by stamping the electrical box mount 100 from a single sheet of material and bending the tab during manufacture to produce the bracket 124. The electrical box mount 100 may also be molded or cast as single part to produce bracket 124. The bracket 124 includes an attached side 132 and a free side 134 joined together by crook 130. The attached and free sides may be similarly proportioned, or they may be differently sized or shaped. Either side may be a variety of shapes, such as square, rectangular, ellipsoid, trapezoidal, arrow- or chevron-shaped, etc., and may be angular or rounded. The support element may be adapted for engagement with the spanning element, or may be integral to the spanning element. In some embodiments, the attached side 132 may be between 0.25 and 1.0 inches deep (such as 0.5 inches) and the free side 134 may be 1.0 and 1.5 inches deep (such as 1⅜ inches), while both sides may have a width of between 1.0 and 2.0 inches (such as 1⅝ inches).

Figure 3A:
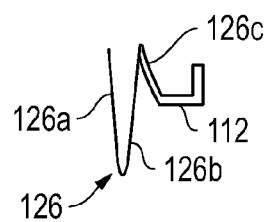
FIGS. 3A-3D illustrate profile views of further example support elements for electrical junction box mounts in accordance with embodiments of the invention.
Figure 3B:
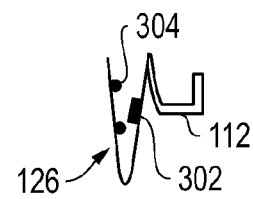

FIGS. 3A-3D illustrate profile views of further example support elements for electrical junction box mounts in accordance with embodiments of the invention. Referring to FIGS. 3A and 3B, bracket 126 is configured to produce an interference fit with the sidewall of the electrical box. Bracket 126 achieves an interference fit of the sidewall between two contact flanges 126a, 126b covering all or a portion of the knockout 164 on sidewall 152. An additional flange 126c extends from one or both of the contact flanges 126a, 126b to mounting rail 112. Alternatively, contact flanges 126a, 126b may be joined to mounting rail 112 by other structural elements such as struts, trusses, or any other structural element as will occur to those of ordinary skill in the art. Contact flanges 126a, 126b of bracket 126 may also be implemented as a folded element, as described above with reference to bracket 124, and may be similarly manufactured.

Figure 3C:
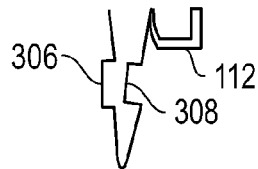
Figure 3D:
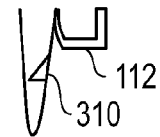

Referring to FIGS. 3B-3D, either or both of the contact flanges 126a, 126b may further include depressions and/or protrusions adapted to mate with standard knockouts on electrical boxes, in order to cooperate with the interference fit produced by engaging mating flanges 126a, 126b with the sidewall. FIG. 3B shows a bracket 126 having a central protrusion 302 adapted to mate with a depressed side of a knockout and two side protrusions 304 adapted to mate with a raised side of the knockout. Protrusions and depressions may be constructed through subtractive or additive fabrication, through molding or casting, or through working (e.g., bending, folding, or embossing) metal or other materials, such as, for example, polymers, plastics, composites, and the like. For example, FIG. 3C shows a bracket 126 formed through metalworking having a central protrusion 308 adapted to mate with a depressed side of a knockout and central depression 306 adapted to mate with a raised side of the knockout. FIG. 3D shows a bracket 126 having a locking tab 310 adapted to engage knockout 164 and constrain electrical box 150 from disengaging movement.

Similar depressions or protrusions may also be incorporated into the attached side or free side of bracket 124. Various combinations of depressions and protrusions in various configurations may be utilized in embodiments of the invention to secure the electrical box to the bracket depending on the shape of the knockouts in the type of electrical box for which the mount is configured; according to whether the bracket is designed for use while the knockout is in place, removed, or both; depending on other design considerations; or for any other reason as will occur to those of ordinary skill in the art.

Figure 4A:
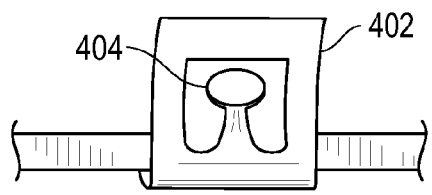
FIGS. 4A-4D illustrate an example support element including a bracket incorporating a clip configured for a spring tension fit with the sidewall of the electrical box in accordance with embodiments of the invention.
Figure 4B:
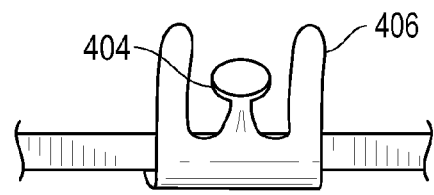
Figure 4C:
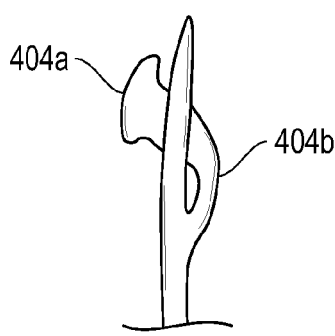
Figure 4D:
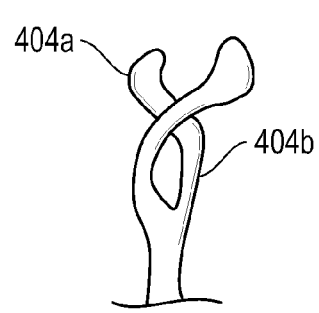
Figure 5A:
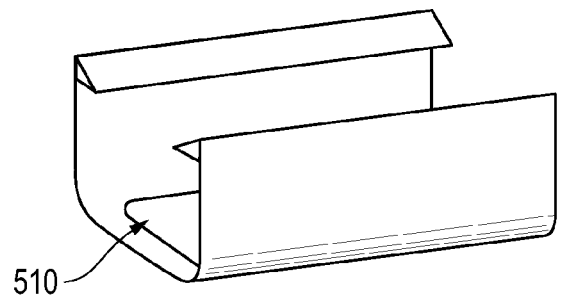
FIGS. 5A-5D illustrate example support elements for electrical junction box mounts in accordance with embodiments of the invention.
Figure 5B:
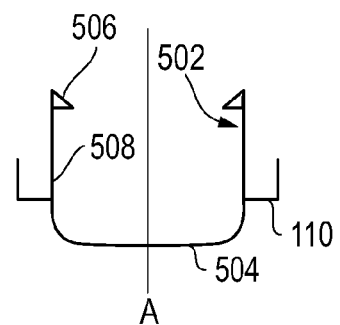
Figure 5C:
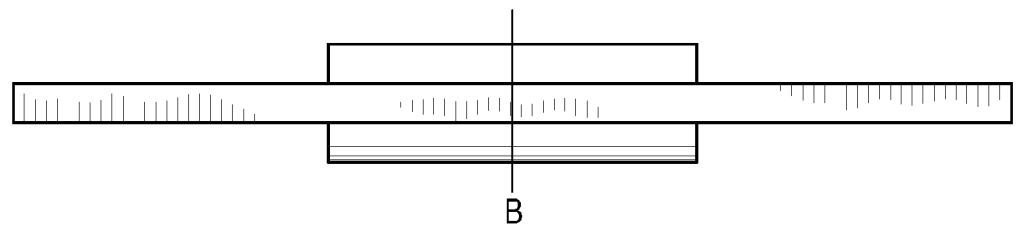
Figure 5D:
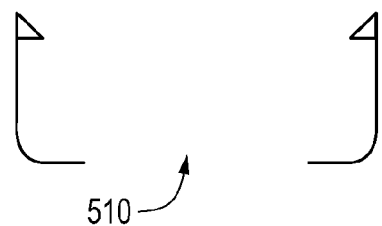

FIGS. 4A-4D illustrate an example support element including a bracket incorporating a clip configured for a spring tension fit with the sidewall of the electrical box in accordance with embodiments of the invention. Referring to FIG. 4A, bracket 402 includes flange elements and is configured to produce an interference fit with the sidewall of the electrical box as described with reference to bracket 124. Clip 404 engages the knockout 164 on sidewall 152. Bracket 402 may be used in a paired configuration so that faces of two opposing sidewalls are engaged. FIG. 4A shows a full bracket 402. Referring to FIGS. 4B and 4C, bracket 406 includes reduced flange elements. As shown in FIG. 4C, tension in the base 404b of clip 404 may force the head 404a past the plane of the bracket 406. Upon engagement with electrical box 150, tension biases the head 404a against a sidewall 152-158 of the electrical box 150. In some embodiments, the head 404a may mate with a knockout 164 upon engagement. Clip 404 is shown manufactured integral to the bracket, but could also be manufactured separately and later attached.

FIGS. 5A-5D illustrate example support elements for electrical junction box mounts in accordance with embodiments of the invention. Spanning member 110 is coupled to bracket 502. Bracket 502 is adapted to constrain two opposing sidewalls of the electrical box towards backstop 504. Upon insertion of electrical box 150 into bracket 502, flanges 508 of bracket 502 may engage opposing sidewalls 152, 154 and 156, 158 of electrical box 150 in a friction fit. Bracket 502 may include locking tabs 506 that engage the front rim 166 of electrical box 150. Backstop 504 defines an opening 510 sufficient to expose knockouts 164 in back wall 162 of electrical box 150 upon bracket 502 being engaged with electrical box 150.

Figure 6A:
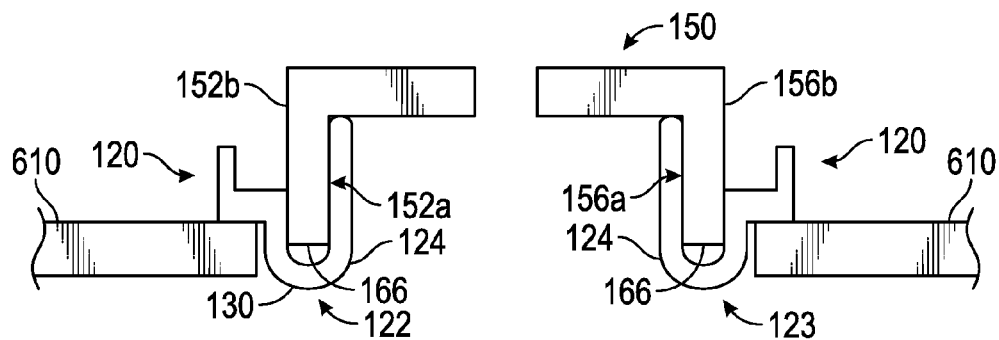
FIGS. 6A-6C illustrate an installed electrical junction box engaged with electrical junction box mounts in accordance with embodiments of the invention.
Figure 6B:
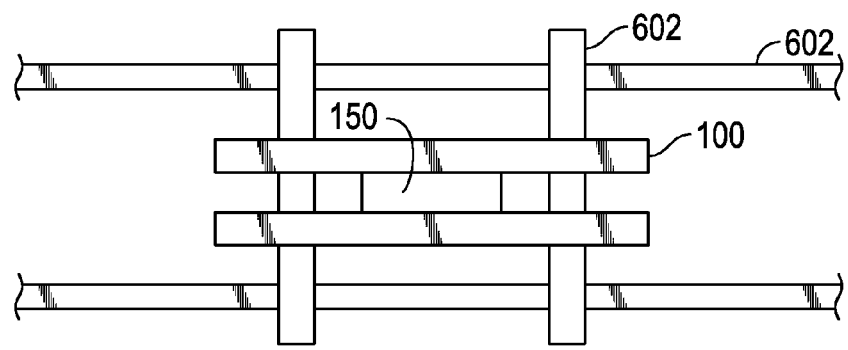
Figure 6C:
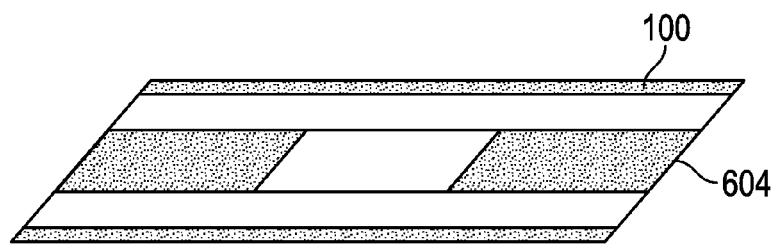

FIGS. 6A-6C illustrate an installed electrical junction box engaged with electrical junction box mounts in accordance with embodiments of the invention. FIG. 6A illustrates a cross section of an installed electrical junction box engaged with electrical junction box mounts in accordance with embodiments of the invention. FIG. 6B illustrates a perspective view of an electrical junction box engaged with electrical junction box mounts installed on frame elements. FIG. 6C illustrates a perspective view of an electrical junction box engaged with electrical junction box mounts installed on an acoustical ceiling tile 604. In operation, support element 120 engages electrical box 150 to install electrical box 150 on electrical box mount 100. Fastener 122 is engaged with faces 152a, 152b of sidewall 152. Fastener 123 is engaged with faces 156a, 156b of sidewall 156 opposite of sidewall 152. Fasteners 122, 123 also support portions of the front rim 166 that rest on them. As shown in FIGS. 6A-6C, support elements 120 are implemented as brackets 124 configured to produce an interference fit with the sidewall of the electrical box. In operation, the front rim 166 of bracket 124 rests on crook 130, which provides support from underneath.

Figure 7:
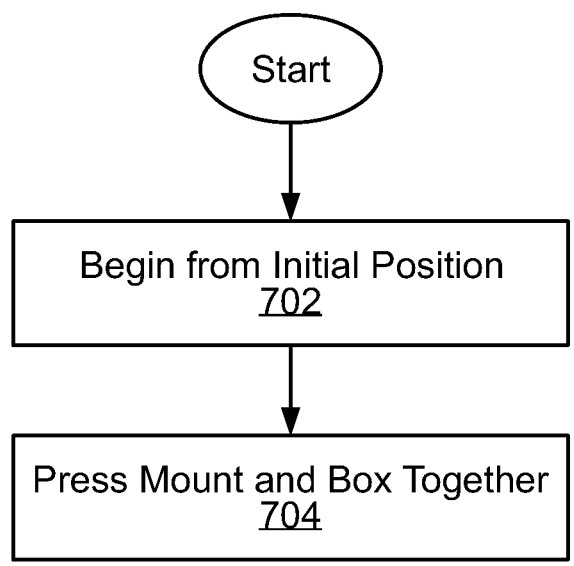
FIG. 7 shows a flowchart illustrating a method in accordance with embodiments of the invention.

During mounting, electrical box mount 100 may be engaged with a sidewall 152 of the electrical box 150 with a one-step motion. FIG. 7 illustrates a method for engaging an electrical junction box with electrical junction box mounts in accordance with embodiments of the invention. The method includes a preparation phase and an engagement phase. In preparation for mounting, the method includes beginning from an initial position (box 702). For example, to mount a single-bracket embodiment of the electrical box mount 100 (FIGS. 2A-2C), a user may engage support element 120 while holding the bracket 124 in-hand with the open side of the bracket 124 oriented away from the palm of the user. From this initial position, the support element 120 may be engaged by pressing the mount 100 and the electrical box 150 towards one another (block 704). For example, the user may engage bracket 124 by firmly pressing the open side of the bracket onto the sidewall 152 of the electrical box 150 at the front rim 164. The electrical box 150 may be supported by a surface or by another hand. Conversely, the user may press the electrical box 150 towards the bracket 124. This method of engaging the mount may be performed without the aid of tools, and with knockouts 164 either in-place or removed. To mount a multi-bracket embodiment of the electrical box mount (FIGS. 2E-2D), a user may begin with a bracket 124 in each hand.

Returning to FIGS. 6A-6C, upon installation on or above the acoustical ceiling tile 604 610, the electrical box mount 100 supports the electrical box 150 and maintains the electrical box in position above the acoustical ceiling tile 604, 610 oriented with a front opening of the electrical box facing the acoustical ceiling tile 604, 610. The electrical box mount 100 may be rated for a maximum load of between 3 and 15 pounds, such as, for example, 5 or 10 pounds. The spanning element may be supported by frame elements of the ceiling grid. FIGS. 6A-6C show the spanning element implemented as a mounting rail 112. FIG. 6A shows mounting rail 112 including openings for attaching the mounting rail to frame elements using wire. The mounting rail may also be adapted with clips other conventional fasteners for engaging the frame elements. Alternatively or additionally, upon installation, the spanning element may rest on, and distribute weight across, the acoustical tile.

The acoustical ceiling tiles 604, 610 may be of a panel type standard to the industry, comprised of fiber materials, polymeric materials, pressed materials, and/or combinations of these materials. The panels may include a bevel or lip to allow for expedient installation between frame members. A variety of ceiling tile materials may be selected as appropriate to a particular application. Typically, ceiling tiles are substantially rectangular, being about 24 inches by about 48 inches and about 0.5 to 0.75 inches thick.

Bracket 124 is compatible with multiple electrical box configurations due to its unique design. The design of bracket 124 allows use of the bracket with most electrical boxes having a sidewall and a front opening. Thus, bracket 124 is compatible with a wide variety of electrical box mounts, including 4/0 boxes, 4-inch square standard boxes, 4-inch square deep/extension ring boxes, single gang boxes, and so on. For example, bracket 124 may be used in conjunction with electrical boxes from Raco (e.g., Raco 189 Square Electrical Box, Raco 232 Square Electrical Box, Raco 153 Octagonal Electrical Box), Lamson Home Products (e.g., Carlon B117RSWR 1-Gang Shallow Old Work Box), Spycor Construction Systems (E-4/0SB Electrical 4/0 Steel Box), and the like.

In manufacturing the electrical box mount 100, the support element 120 may be integral to the spanning element 110. That is, the spanning element 110 and the support element 120 may be formed from the same continuous piece of material. For example, the support element 120 and the spanning element 110 may be cast or molded in one mold. Alternatively, the spanning element 110 and the support element 120 may be machined, stamped, or otherwise cut as one continuous piece from the same block or sheet of plastic or metal. Other parts, such as protrusions, coupling members, and the like may also be formed integrally with the electrical box mount 100. The electrical box mount 100 may be fabricated using a single stage operation, wherein every stroke of a press produces a desired form on a sheet metal part, or could occur through a series of stages.

For example, support element 120 (e.g., bracket 124) may be manufactured by progressive stamping of sheet metal. As a strip of metal is fed from a coil, where it progresses though all the stations of a progressive stamping die. Each station performs one or more operations until a finished part is made. One station is a cutoff operation, which separates the part from a carrying web. The process may include deep drawing, roll forming, or bending the metal, which may be a semi-finished material, to form a spanning element 110 and a support element 120 connected to the spanning element 110. Example bending operations may include for example, air bending, bottoming, coining, U-die bending, wiping die bending, rotary bending, and so on. In other examples, portions of the electrical box mount 100 may be folded by hand during manufacture, during preparation at the job site, or during installation.

Figure 8A:
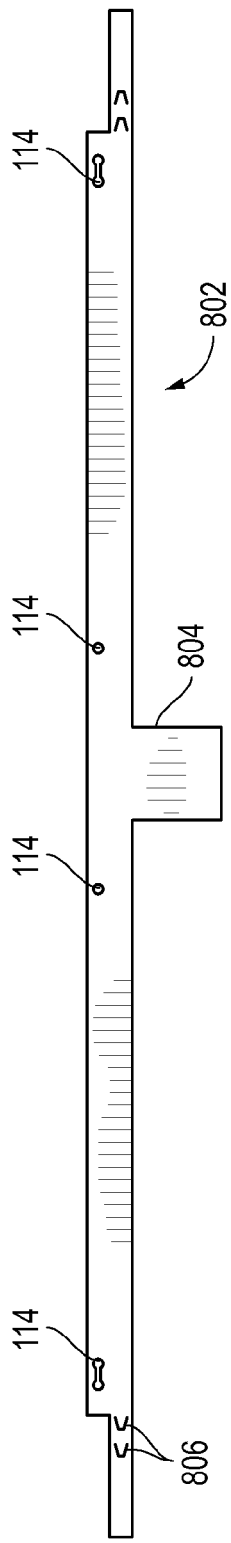
FIGS. 8A-8B illustrate blank metal parts in accordance with embodiments of the invention.
Figure 8B:
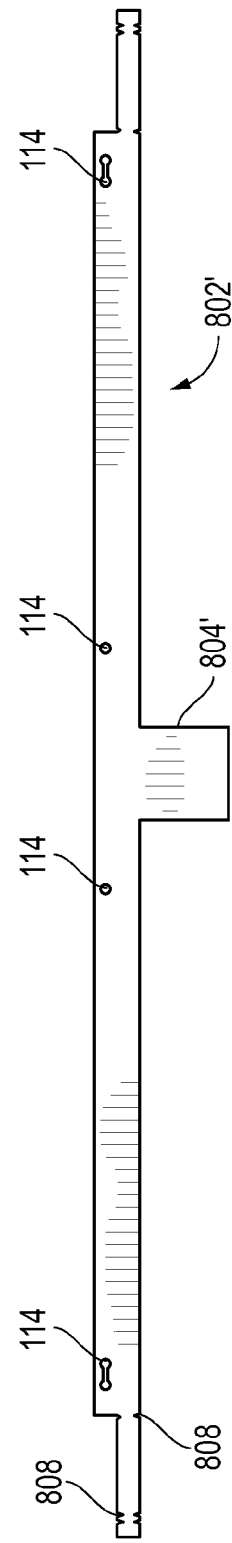

FIGS. 8A and 8B illustrate blank metal parts configured for forming into an electrical box mount in accordance with embodiments of the invention. Blank metal parts 802 and 802' include tabs 804 and 804', respectively, configured to be folded into a bracket; blank metal parts 802 and 802' also define openings 114 for receiving wire used in connecting the mounting rail to a support structure. Blank metal part 802 includes chevron punches 806 to allow for tabs. Blank metal part 802' includes notches 808 configured to provide folding points by weakening the portion of the blank metal part adjacent to the notch to facilitate deformation between notches. In other embodiments, folding points may be provided through the use of stamping or scoring.

The discussion above has focused primarily on embodiments of the invention for use with acoustical tile suspended ceilings and on elements forming an integral electrical box mount. Other embodiments may be used with other ceiling types. The electrical box mount may also include embodiments including support members with advantageous features described above, wherein the support member (or mount including the support member) is adapted for attachment to conventional spanning members. It should be understood that the inventive concepts disclosed herein are capable of many modifications. To the extent such modifications fall within the scope of the appended claims and their equivalents, they are intended to be covered by this patent.

What is claimed is:

1. A ceiling mount for an electrical junction box supported by a second mount, the electrical junction box including a plurality of sidewalls, a rim formed by edges of the plurality of sidewalls, a front opening, a back wall, the second mount supporting a first sidewall of the plurality of sidewalls, the ceiling mount comprising:
    a single mounting rail having an "L" shaped cross-section; and
    a single folded tab projecting from the mounting rail, the folded tab having a first side projecting from an edge of the mounting rail, a second side, and a crook flexibly connecting the first side with the second side, wherein:
    the first side and the second side of the folded tab are aligned parallel to the mounting rail,
    the second side is longer than the first side,
    the second side has an edge that seats vertically higher than a highest edge of the railing mount,
    the crook is formed to seat a rim of a second sidewall of the plurality of sidewalls, and
    a space between the first side and the second side is selected to form an interfering engagement between the tab and the second sidewall; and
    the second mount being separate from the ceiling mount, the second mount and the ceiling mount cooperating to support the electrical junction box by each separately supporting the first sidewall and the second sidewall, respectively.

2. The ceiling mount of claim 1 wherein the single mounting rail is integral to the single folded tab.

3. The ceiling mount of claim 1 wherein the single mounting rail has a length selected to traverse an acoustical ceiling tile.

4. The ceiling mount of claim 3 wherein the single folded tab is configured to orient the front opening to face the acoustical ceiling tile upon the installation of the electrical junction box mount.

5. The ceiling mount of claim 1 wherein the first side and the second side form a V shape.

6. The ceiling mount of claim 1 wherein the second mount and the ceiling mount do not support a third and a fourth sidewall of the plurality of sidewalls of the electrical junction box.

* * * * *